June 17, 1969            C. LENZ           3,450,023
APPARATUS FOR MAKING BEER WORT
Filed May 2, 1967
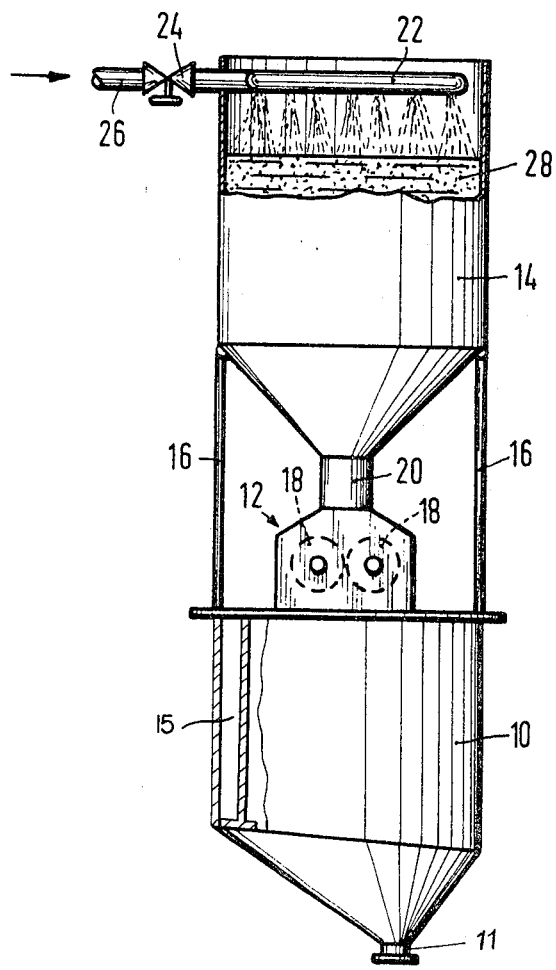
INVENTOR
Conrad Lenz
By: Low and Berman
Agents 3,450,023
APPARATUS FOR MAKING BEER WORT
Conrad Lenz, Annenhofstrasse 2, Freising, Germany
Filed May 2, 1967, Ser. No. 635,569
Claims priority, application Germany, May 10, 1966,
L 53,552
Int. Cl. C12l 7/02; C12c 7/06
U.S. Cl. 99—278                    6 Claims

ABSTRACT OF THE DISCLOSURE

An apparatus for making beer wort is equipped with a crushing mill for wet crushing of malt, the mill being directly mounted on top of a tank so that the crushed malt falls from the gap between the crushing rollers into the tank to form mash with water held in the tank.

BACKGROUND OF THE INVENTION

The invention relates to brewing equipment, and particularly to apparatus for making beer wort.

It was common practice for many years to crush dry malt in a grist mill, and to store the crushed, dry malt until needed, whereupon it was transported to a tank for mixing with water, the resulting suspension of malt in water constituting mash.

More recently, wet crushing equipment for malt was introduced into breweries. The malt is moistened prior to crushing, and the crushed material is continuously mixed with additional water as it is discharged from the gap between the crushing implements of the mill. The device for mixing the crushed malt with the additional water is thus an integral element of the more modern wet crushing apparatus.

The wet crushing apparatus discharges a continuous stream of mash most suitable for relatively large breweries in which one crushing mill of the type described can be linked to several mash-heating installations, each installation having one or two vessels which are supplied with mash from a single, continuously operating crushing mill. The pumps, piping and valving necessary for the aforedescribed mash-making apparatus and its mash distribution system are too costly for small breweries having a single set of mash-heating tanks. Yet, the yield of wort from wet-crushed malt is substantially greater than from malt which is crushed dry in the earlier manner.

It is a primary object of the instant invention to make the known advantages of wet crushed malt available to small breweries at low cost.

SUMMARY OF THE INVENTION

According to the invention, a crushing mill for wet malt is arranged directly above the tank of a mash-heating apparatus whose bottom is normally sealed so that it is adapted to hold a body of liquid. The movable crushing implements of the mill define a gap through which the malt is passed for crushing, and the tank is formed with an upward opening which is aligned with the gap for gravity discharge of the crushed malt into the tank. Water and malt are fed to the crushing implements.

The exact nature of this invention as well as other objects and advantages thereof will be readily apparent from consideration of the following specification relating to the annexed drawing.

BRIEF DESCRIPTION OF THE DRAWING

The sole figure of the attached drawing shows a wort making apparatus of the invention in elevation, and partly in section.

DESCRIPTION OF THE PREFERRED EMBODIMENT

A mash heating tank 10 is provided with a normally sealed bottom-discharge nipple 11 so that the tank can hold a stationary body of liquid. A grist mill or crushing mill 12 is flanged to the top of the tank 10 which is open to the mill housing. A malt bin 14 is mounted on the tank 10 by means of upright columns 16 in vertical alignment with the mill 12.

The crushing implements of the mill are two cylindrical rollers 18 which are driven in a conventional manner, not shown, to crush material which passes the vertical gap between the rollers. Malt is guided from the downwardly tapering bottom of the bin 14 into the gap between the rollers 18 by a vertical connecting duct 20.

The bottom of the bin 14 and the duct 20 also guide water from a sprinkler pipe 22 to the mill 12. The sprinkler pipe extends in a closed, horizontal circle near the top of the bin 14 and is supplied with water through a control valve 24 at the end of a supply line 26.

Water is sprinkled from the pipe 22 on a batch of malt 28 which initially fills the bin 14, the duct 20 and the portion of the mill 12 above the rollers 18 but cannot pass the gap between the rollers as long as the same are not rotated. The water discharged from the pipe 22 moistens the malt, and drips downward into the tank 10 where it is collected. The valve 24 is set in such a manner that the amount of water necessary for converting the malt 28 into a corresponding amount of mash is admitted during a period long enough to swell and soften the malt to the extent needed for successful wet crushing, normally about 15 to 20 minutes.

The rollers 20 are then driven and the malt passes from the bin 14 through the mill 12 into the tank 10 where it is dispersed in the water previously collected there by means of an agitator (not shown), the mixture or mash so produced then being heated in the tank 10 by a heating jacket 15.

If a small brewery has more than one mash-heating installation of the type represented by the tank 10, but not fully illustrated in the drawing, each tank may be equipped with a separate wet crushing mill at relatively low cost. It is not practical to crush wet malt at a central installation, and to convey the crushed, water-bearing material to several tanks in the manner customary with dry crushed malt. The wet crushed material also cannot be stored successfully, and must be dispersed at once in enough water to form mash. The afore-described apparatus meets these requirements.

It will be appreciated that the connecting duct 20 may be equipped with a rotary feeder for metering the malt from the bin 14 to the rollers 18 as disclosed in my simultaneously filed application, Ser. No. 635,570 but the feeder is not entirely necessary for the batch operation for which the illustrated apparatus is primarily intended.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. An apparatus for making beer wort comprising, in combination:
   (a) a tank including means sealing the bottom of said tank, whereby said tank is adapted to hold a body of liquid;
   (b) a crushing mill arranged above said tank, said mill including a plurality of crushing implements movable relative to each other and defining a gap, said tank being formed with an upward opening vertically aligned with said gap;

(c) heating means on said tank for heating the contents thereof; and (d) feeding means for feeding water and malt to said implements.

2. An apparatus as set forth in claim 1, further comprising fastening means securing said mill on said tank.

3. An apparatus as set forth in claim 1, wherein said feeding means include a bin superimposed on said mill and adapted to hold a body of said malt, and water supply means for supplying said water to said bin.

4. An apparatus as set forth in claim 3, further comprising a connecting duct connecting said bin to said mill; said bin, said connecting duct, said mill, and said tank being vertically aligned and jointly constituting an upright conduit for gravity flow of said water from said bin to said tank.

5. An apparatus as set forth in claim 4, said water supply means including a water supply line, and control valve means in said supply line for controlling the rate of water supply to said bin.

6. An apparatus as set forth in claim 1, wherein said implements include two crushing rollers defining said gap therebetween.

References Cited

UNITED STATES PATENTS 2,343,706 3/1944 Reich _____ 99—278 X
3,128,189 4/1964 Watts _____ 99—278 X ROBERT W. JENKINS, *Primary Examiner.*

U.S. Cl. X.R.

99—31